A. E. GILLILAN.
Churn.
No. 78,589.
Patented June 2, 1868.
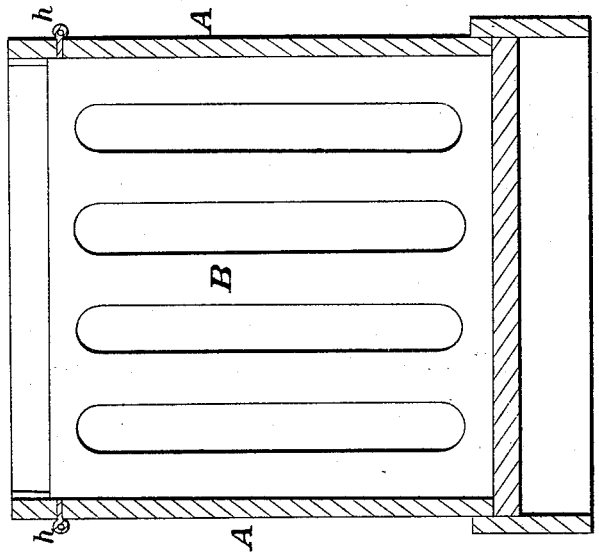
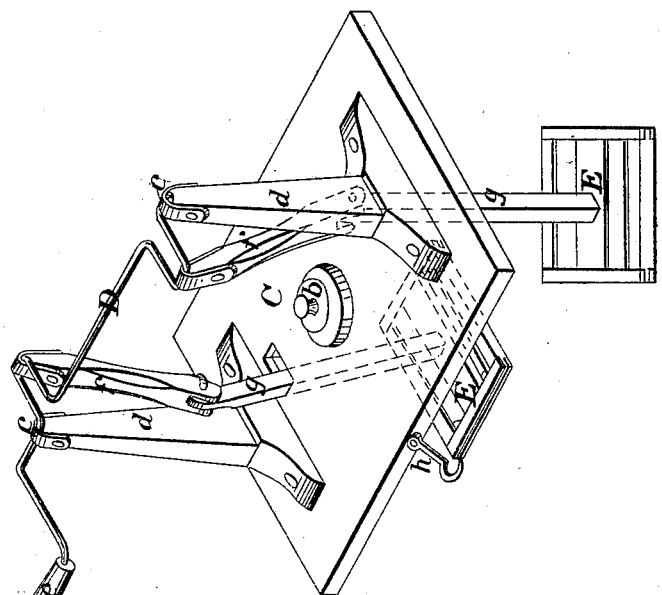
Witnesses:
Inventor:

United States Patent Office.

A. E. GILLILAN, OF MARION, IOWA.

Letters Patent No. 78,589, dated June 2, 1868.

---

IMPROVEMENT IN CHURNS.

---

The Schedule referred to in these Letters Patent and making part of the same.

---

TO ALL WHOM IT MAY CONCERN:

Be it known that I, A. E. GILLILAN, of Marion, in the county of Linn, and State of Iowa, have invented certain new and useful Improvements in Churns; and I do hereby declare that the following is a full, clear, and exact description thereof, reference being had to the accompanying drawings, and to the letters of reference marked thereon, which form a part of this specification, in which—

Figure 1 represents a perspective view of the cover and its attachment, and

Figure 2 a central sectional view of my churn.

The nature of this invention consists in constructing a churn with certain novel and useful features, the peculiarities of which will be hereinafter set forth.

To enable others skilled in the art to make and employ my invention, I will now describe its construction and operation.

A represents the box or casing, the inside of which is cut or furnished with two vertical grooves near the centre of said box, and opposite each other. Sliding in these grooves is the partition B, said partition being provided with a series of slots, nearly the length of the partition, and of a suitable width, said slots being rounded at their upper and lower terminations, as seen in fig. 2.

C designates the cover or top, which is secured to the box A by means of hooks and eyes, $h\,h$. Said cover is furnished on its upper side with two blocks, into which are mortised the bevelled uprights $d\,d$, which will be referred to more fully hereafter. The cover C is also furnished with an opening for pouring the cream into the churn, and which is stopped by a cover, $b$.

D represents the crank-shaft, provided at one end with the handle $e$, and having its bearing on the uprights $d\,d$, and confined thereon by means of metal straps or bands, $c\,c$. Said crank-shaft is also formed with two other cranks, one on each side of its centre, and on opposite sides.

Attached to each of these cranks, by means of metal loops, are the arms $f\,f$, which are slotted at their lower ends to receive the upper ends of the long arms $g\,g$, said arms $g\,g$ being secured therein by means of pins.

The arms $g\,g$ are made to pass through holes in the cover or top C, and are secured at their lower ends to the dashers E E.

The dashers E E are each furnished with two slats, said slats being bevelled on each of their sides, and pivoted between the inner ends of the frame of the dashers, as seen in fig. 1.

Having thus described my invention, what I claim as new, and desire to secure by Letters Patent, is—

The dashers E E and adjustable slotted board B, as constructed in combination with arms $f\,f$, $g\,g$, and crank-shaft D, when all are arranged and operated as and for the purpose set forth.

In testimony that I claim the foregoing as my own, I affix my signature in presence of two witnesses.

A. E. GILLILAN.

Witnesses:
　JAMES KEES,
　M. E. LONG.